(12) United States Patent
Friedman et al.

(10) Patent No.: US 6,553,466 B1
(45) Date of Patent: Apr. 22, 2003

(54) SHARED MEMORY BLOCKING METHOD AND SYSTEM

(75) Inventors: George Friedman, Austin, TX (US); Robert Phillip Starek, Austin, TX (US); Carlos A. Murdock, Austin, TX (US)

(73) Assignee: Infraworks Corporation, TX (US)

( * ) Notice: Subject to any disclaimer, the term of this patent is extended or adjusted under 35 U.S.C. 154(b) by 0 days.

(21) Appl. No.: 09/701,202

(22) PCT Filed: Sep. 29, 2000

(86) PCT No.: PCT/US00/26894
§ 371 (c)(1),
(2), (4) Date: Nov. 27, 2000

(87) PCT Pub. No.: WO01/25930
PCT Pub. Date: Apr. 12, 2001

Related U.S. Application Data

(60) Provisional application No. 60/157,472, filed on Oct. 1, 1999.

(51) Int. Cl.[7] .............................................. G06F 12/14
(52) U.S. Cl. ........................... 711/152; 711/163; 707/8
(58) Field of Search ............... 707/8, 201, 203; 711/147, 150, 151, 152, 163

(56) References Cited

U.S. PATENT DOCUMENTS

| | | | | |
|---|---|---|---|---|
| 5,455,944 A | * | 10/1995 | Haderle et al. ............. | 707/202 |
| 5,657,474 A | * | 8/1997 | Paul Dubois Taine et al. ... | 711/163 |
| 5,918,229 A | | 6/1999 | Davis et al. ................... | 707/10 |
| 5,940,869 A | * | 8/1999 | Schwartz ..................... | 711/206 |
| 5,987,506 A | | 11/1999 | Carter et al. ................. | 709/213 |
| 6,026,474 A | | 2/2000 | Carter et al. ................. | 711/202 |
| 6,085,296 A | | 7/2000 | Karkhanis et al. .......... | 711/147 |

\* cited by examiner

*Primary Examiner*—Gary J Portka
(74) *Attorney, Agent, or Firm*—Piper Rudnick LLP

(57) ABSTRACT

A shared memory blocking method and particularly applicable to a system in which protected data is transmitted to a recipient computer. The method comprises reserving a memory page for a requesting application, committing a memory page to the requesting application's address space, which call may be made by the process providing the page reserve call or by a subsequent process, and providing security checks to complete the requests. The security checks include determining whether the process is secured by consulting a secured process list and determining whether the page is shared by consulting a shared memory list. Further disclosed are a computer readable medium and computer programmed to block shared memory, shared memory blocking system and secured data transmission system.

25 Claims, 3 Drawing Sheets

SHARED MEMORY BLOCKING METHOD AND SYSTEM

This application claims the benefit of Provisional application Ser. No. 60/157,472, filed Oct. 1, 1999.

FIELD OF THE INVENTION

The invention relates to the protection of data stored in a computer, and more particularly to data which has been imported from an outside source.

BACKGROUND OF THE INVENTION

Shared memory may be used to communicate between two or more concurrently running jobs or threads. One program creates a memory segment which other processes may access.

Shared memory may be exploited for leaking data. "Leaking data" as used herein means transferring data out of a system in which it is desired to have the data secured. A data leak may occur if a process writes information to a shared memory location and another process accesses the information from that location.

It is known to lock shared memory, usually to avoid processes accessing data out of sequence to ensure use of only updated shared data. Access to shared memory space is prohibited during use by a first process and thereafter unlocked to allow processes sharing the space access to updated data. Memory locking as known in the art is not a solution to data leakage. Accordingly, where data security is important, there is a need to limit data leakage from shared memory.

SUMMARY OF THE INVENTION

The invention discloses a shared memory blocking method particularly applicable to a system in which protected data is transmitted to a recipient computer. An illustrative embodiment of the invention comprises reserving a memory page for a requesting application, committing a memory page to the requesting application's address space, which call may be made by the process providing the page reserve call or by a subsequent process, and providing security checks to complete the requests. The security checks may include determining whether the process is secured by consulting a secured process list and determining whether the page is shared by consulting a shared memory list.

Further disclosed are a shared memory blocking system, secured data transmission system, computer readable-medium programmed to block shared memory and computer configured to block shared memory.

DESCRIPTION OF THE DRAWINGS

The invention is best understood from the following detailed description when read with the accompanying figures.

DETAILED DESCRIPTION OF THE INVENTION

The invention disclosed may prohibit processes with shared pages from accessing secured data. The terms "information" and "data" as used herein are each intended to include the broadest definition of the other, and each include text, audio and video data. By way of further example, the term "information" can mean raw data, processed data, or a combination of raw and processed data. Blocking processes from sharing pages may reduce or eliminate data leakage from shared memory. Embodiments of the invention includes a security check before a process is allowed to open a secured data file. The security check may comprise ascertaining the shared memory state of the process and determining whether the process is on a secured process list.

The shared memory blocking process may be broken down into two primary parts. The first part comprises hooking service calls, including reserve, commit and free calls, used to collect data. The second part includes using data to govern access to secured data.

The shared memory blocking of the present invention is best described as it may be implemented in a secured data transmission system. An illustrative example of such as system comprises two main components, a data packager and a receiver. The packager is used to create packages that carry file content to target recipients. The receiver runs on a recipient computer to allow access to packaged file content.

Figure 1:
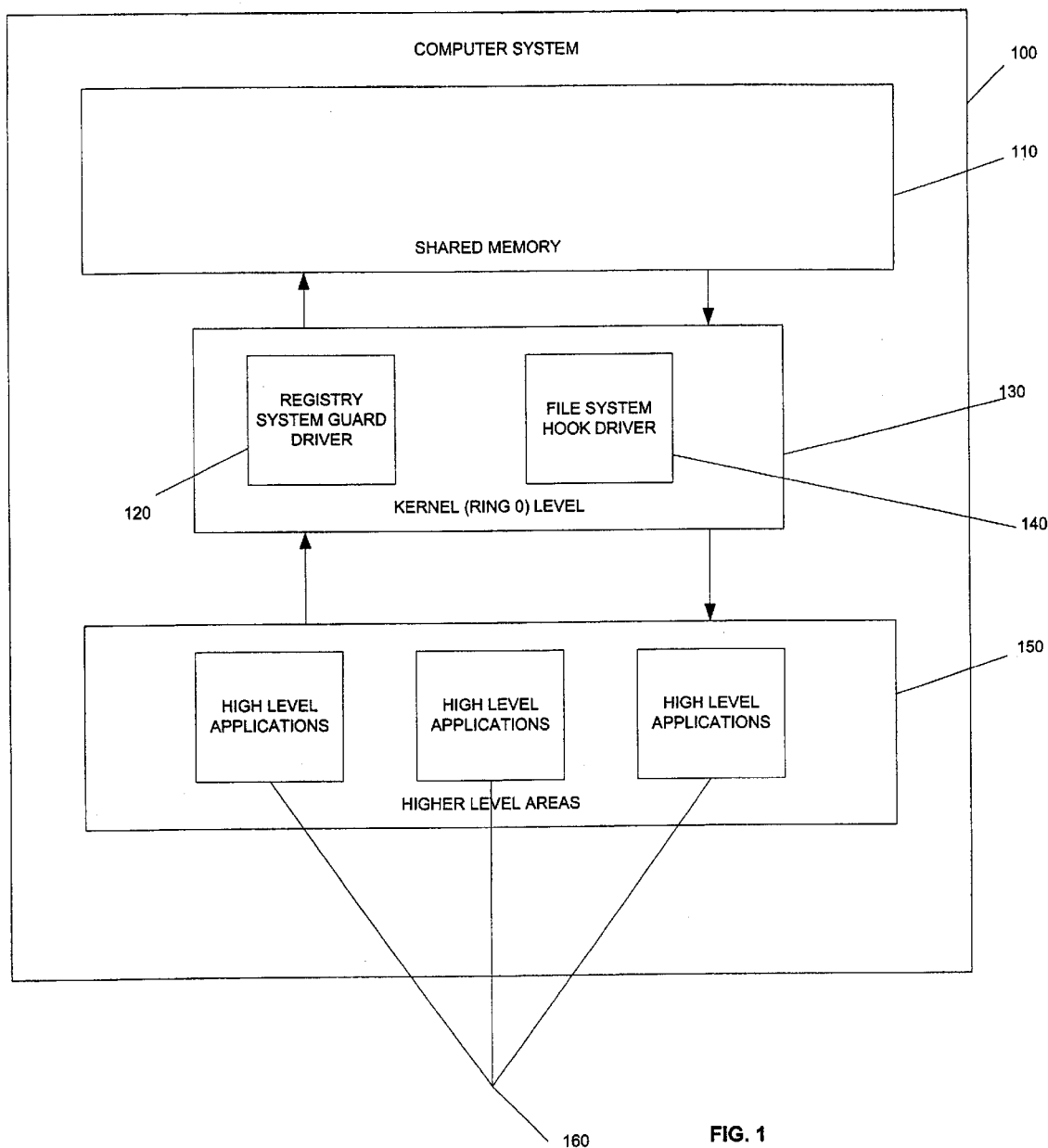
FIG. 1 is a block diagram of a portion of a secured data transmission system according to an illustrative embodiment of the invention.

FIG. 1 depicts an illustrative computer system 100 according to an embodiment of the invention. A registry entry guard driver 120 is in communication with file system hook driver 140. Both drivers exist on the kernel (ring O) level 130. Applications 160 run on higher levels 150. When applications 160 request access to shared memory 110, guard driver 120 in conjunction with hook driver 140 monitors and handle the requests.

A package carries data and provides associated information to a command center which is a component of an application programming interface, such as a Win32 process. A communication driver handles communication between the application programming interface and a plurality of device drivers. It provides a single set of device driver I/O control functions that are called from the application programming interface to send information to or retrieve information from the device drivers. The communication driver is called by a hook driver to notify the command center that a process is trying to open a packaged file. The device drivers, together with the application programming interface, marshal the packaged content into a vault and support access to the content, subject to an originator's permission selection. The command center may watch for packages to be executed and prompt users for file names to save a package payload. It may notify the file system hook driver that a package payload should be absorbed into the vault. It may present users with dialog indicating that an application is attempting to open a packaged file. It may also notify device drivers 160 when applications exit. The command center may block clipboard access and terminate applications at the request of a permissions device driver when permissions expire. Permission information is contained in a database and may include, for example, file names, package ID, file system ID and file permissions. File permissions may include, but are not limited to, length of time or number of times a file may be open, date after which a file may no longer be opened, and printing and clipboard permissions.

File system hook driver 140 obtains a data request initiated from a user who is looking to access a packaged or absorbed file. When hook driver 140 receives the requests it performs a security check on the process and then queries the user. The process is then added to a secured process list and future access is blocked.

Figure 2A:
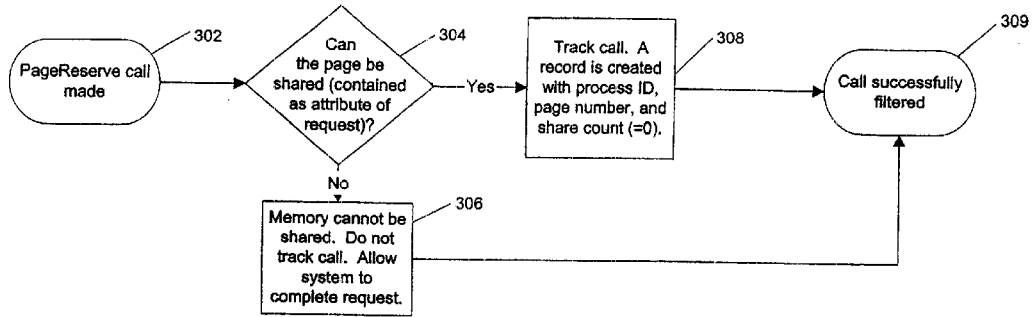
FIGS. 2A–D are flow charts of a shared memory blocking method according to an illustrative embodiment of the invention.
Figure 2B:
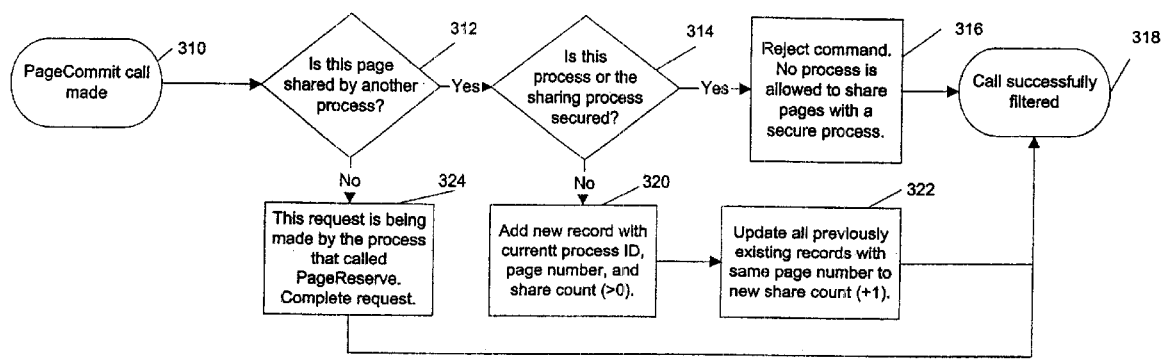

Following is an illustrative embodiment of the invention. Those skilled in the art will understand that variations on the shared memory blocking that include security checks to determine whether processes are secured and whether pages are shared are equivalent to the steps described herein, and thus, are within the spirit and scope of the invention. The illustrative embodiment of shared memory blocking is depicted in FIGS. 2A–D. FIG. 2A is a flow chart of an exemplary page reserve call filtering sequence. The reserve call reserves a page of memory for a requesting application. The filtering sequence begins by providing the call in step 302. The call is then filtered by first determining whether the page can be shared based on request parameters in step 304. If the page cannot be shared the request is allowed to be completed in step 306 thereby successfully filtering the call in step 309. If the page can be shared, the reserve call is tracked in step 308 by creating a record and entering the record into a shared memory list thereby filtering the call in step 309. The record may include a process ID, page number and share count. FIG. 2B depicts an exemplary sequence for filtering a page commit call. The page commit call is provided to commit the memory page for the requesting process or for a subsequent requesting process in step 310. In step 312 it is determined, by accessing the shared memory list, if the page is shared by another process. If the page is shared, it is determined whether either of the sharing processes are secured in step 314 by accessing a secured process list. The secured process list is created by continually compiling records produced when a user attempts to open a protected file. If either process is secured, page sharing is not allowed as shown in step 316, and the commit call is successfully filtered in step 318. If both processes are not secured, a new shared memory record is created in step 320, and the shared memory list is updated with information contained in the new record in step 322. The share count is also updated for any processes sharing the page. Accordingly, the call is successfully filtered in step 318. If the page is not shared, the commit request is completed in step 324 and hence successfully filtered in step 318. The committed application is then performed.

Figure 2C:
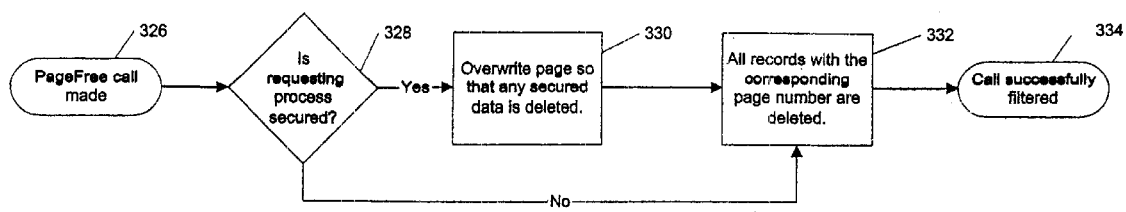

FIG. 2C depicts an illustrative filtering sequence for a page free call. The page free call may be used to free the memory page of some or all address spaces. The call is provided in step 326. In step 328 it is determined whether the process is secured by checking the secured process list. If the process is secured, the page is overwritten to delete secured data in step 330, and all records in the shared memory list with a page number the same as the overwritten page are deleted in step 332. If the process is not secured all records from the shared memory list with a page number corresponding to the unsecured process page are also deleted in step 332. Once pages are deleted, the page free call is successfully filtered in step 334.

Figure 2D:
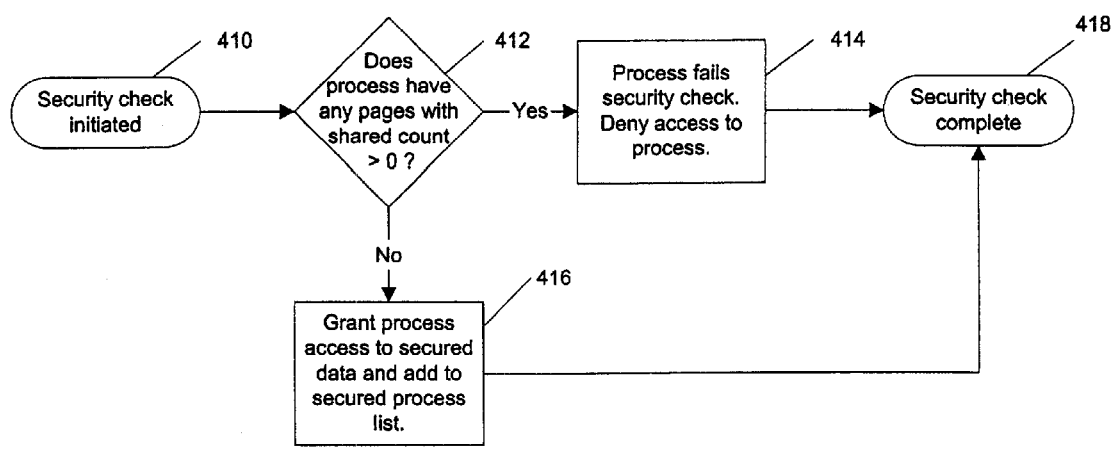

Before a process is allowed to open packaged data via the hook driver, a security check is performed to determine the shared memory state of the process, and hence, to determine whether access to the process should be granted. No process with shared pages is allowed to access packaged data. FIG. 2D is a flow chart of a shared memory state security check. In step 410 the security check is initiated. In step 412 it is determined whether the process has any pages with a share count greater than zero. If the process has any pages with a share count greater than zero the process fails the security check and access is denied to the process in step 414. If the process does not have any shared pages with a shared count greater than zero then in step 416 access to the secured data is granted and the process is added to the secured process list. Completing steps 414 and 416 completes a security check as shown in step 418.

A further illustrative embodiment of the invention is directed to a shared memory blocking system wherein the system blocks memory according to methods provided herein. The illustrative shared memory blocking system embodiment comprises an applications programming interface to marshal one or more packaged files into a secured vault and support file content access. The applications programming interface includes a command center to monitor package access. A file system hook driver is in communication with the command center and with a registry entry guard driver to carry out shared memory blocking.

Further disclosed is a secured data transmission system having a receiver component to access secured file content provided by a sender, wherein the receiver includes a shared memory blocking system.

Still further disclosed are a computer configured to block shared memory and a computer-readable medium programmed to block shared memory, both according to methods provided herein. The terms "computer" or "computer system" as used herein include any device capable of transmitting information including, without limitation, a personal computer, such as a laptop, palm PC, desktop or workstation, a network server, a mainframe, an electronic wired or wireless device, such as for example, a telephone, an interactive television or electronic box attached to a television, such as for example, a television adapted to be connected to the Internet, a cellular or mobile telephone, a personal digital assistant, an electronic pager, and a digital watch. In an illustrative example information is transmitted in the form of e-mail.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments but be interpreted within the full spirit and scope of the appended claims and their equivalents.

What is claimed is:

1. A shared memory blocking method comprising:
 providing a call to reserve a memory page for a requesting process;
 filtering the reserve call according to whether the page can be shared;
 providing a call to commit the memory page for the requesting process or for a subsequent requesting process;
 filtering the commit call according to whether the page can be shared and whether the process can be secured;
 wherein filtering the reserve call comprises:
 determining whether the page can be shared based on request parameters; and
 if the page cannot be shared, allowing the request to be completed; or if the page can be shared, tracking the reserve call by creating a record and entering the record into a shared memory list.

2. The method of claim 1 wherein the record includes a process ID, page number and share count.

3. The method of claim 1 wherein filtering the commit call comprises:
 determining, by accessing a shared memory list, if the page is shared by another process;

if the page is shared, determining whether either of the sharing processes are secured by accessing a secured process list; and if either process is secured, disallowing page sharing; or if both processes are not secured, creating a new shared memory record, updating the share count for processes sharing the page and updating the shared memory list with information contained in the new record; or if the page is not shared, completing the commit request.

4. The method of claim 3 wherein the record includes a process ID, page number and share count.

5. The method of claim 1 further comprising:

providing a call to free the memory page of all address spaces;

determining whether the process is secured by checking a secured process list; and if the process is secured, overwriting the page to delete secured data, and deleting all records in the shared memory list with a page number the same as the overwritten page; or if the process is not secured deleting all records from a shared memory list with a page number corresponding to the unsecured process page.

6. A shared memory blocking system wherein the system blocks shared memory by a method comprising:

providing a call to reserve a memory page for a requesting process;

filtering the reserve call according to whether the page can be shared;

providing a call to commit the memory page for the requesting process or for a subsequent requesting process;

filtering the commit call according to whether the page can be shared and whether the process can be secured;

wherein filtering the commit call comprises:

determining, by accessing a shared memory list, if the page is shared by another process;

if the page is shared, determining whether either of the sharing processes are secured by accessing a secured process list; and if either process is secured, disallowing page sharing; or if both processes are not secured, creating a new shared memory record, updating the share count for processes sharing the page and updating the shared memory list with information contained in the new record; or if the page is not shared, completing the commit request.

7. The shared memory blocking system of claim 6 wherein filtering the reserve call comprises:

determining whether the page can be shared based on request parameters; and if the page cannot be shared, allowing the request to be completed; or if the page can be shared, tracking the reserve call by creating a record and entering the record into a shared memory list.

8. The shared memory blocking system of claim 7 wherein the record includes a process ID, page number and share count.

9. The shared memory blocking system of claim 6 wherein the record includes a process ID, page number and share count.

10. The shared memory blocking system of claim 6 further comprising:

providing a call to free the memory page of all address spaces;

determining whether the process is secured by checking a secured process list; and if the process is secured, overwriting the page to delete secured data, and deleting all records in the shared memory list with a page number the same as the overwritten page; or if the process is not secured deleting all records from a shared memory list with a page number corresponding to the unsecured process page.

11. A secured data transmission system having a receiver to access secured file content provided by a sender, wherein the receiver includes a shared memory blocking system wherein the system blocks shared memory by a method comprising:

providing a call to reserve a memory page for a requesting process;

filtering the reserve call according to whether the page can be shared;

providing a call to commit the memory page for the requesting process or for a subsequent requesting process;

filtering the commit call according to whether the page can be shared and whether the process can be secured;

providing a call to free the memory page of all address spaces;

determining whether the process is secured by checking a secured process list; and if the process is secured, overwriting the page to delete secured data, and deleting all records in the shared memory list with a page number the same as the overwritten page; or if the process is not secured deleting all records from a shared memory list with a page number corresponding to the unsecured process page.

12. The secured data transmission system of claim 11 wherein filtering the reserve call comprises:

determining whether the page can be shared based on request parameters; and if the page cannot be shared, allowing the request to be completed; or if the page can be shared, tracking the reserve call by creating a record and entering the record into a shared memory list.

13. The secured data transmission system of claim 12 wherein the record includes a process ID, page number and share count.

14. The secured data transmission system of claim 11 wherein filtering the commit call comprises:

determining, by accessing a shared memory list, if the page is shared by another process;

if the page is shared, determining whether either of the sharing processes are secured by accessing a secured process list; and if either process is secured, disallowing page sharing; or if both processes are not secured, creating a new shared memory record, updating the share count for processes sharing the page and updating the shared memory list with information contained in the new record; or if the page is not shared, completing the commit request.

15. The secured data transmission system of claim 14 wherein the record includes a process ID, page number and share count.

16. A computer configured to block shared memory by a method comprising:

providing a call to reserve a memory page for a requesting process;

filtering the reserve call according to whether the page can be shared;

providing a call to commit the memory page for the requesting process or for a subsequent requesting process;

filtering the commit call according to whether the page can be shared and whether the process can be secured;

wherein filtering the reserve call comprises:

determining whether the page can be shared based on request parameters; and the page cannot be shared, allowing the request to be completed; or if the page can be shared, tracking the reserve call by creating a record and entering the record into a shared memory list.

17. The computer of claim 16 wherein the record includes a process ID, page number and share count.

18. The computer of claim 16, wherein filtering the commit call comprises:

determining, by accessing a shared memory list, if the page is shared by another process;

if the page is shared, determining whether either of the sharing processes are secured by accessing a secured process list; and if either process is secured, disallowing page sharing; or if both processes are not secured, creating a new shared memory record, updating the share count for processes sharing the page and updating the shared memory list with information contained in the new record; or if the page is not shared, completing the commit request.

19. The computer of claim 18 wherein the record includes a process ID, page number and share count.

20. The computer of claim 16 further comprising:

providing a call to free the memory page of all address spaces;

determining whether the process is secured by checking a secured process list; and if the process is secured, overwriting the page to delete secured data, and deleting all records in the shared memory list with a page number the same as the overwritten page; or if the process is not secured deleting all records from a shared memory list with a page number corresponding to the unsecured process page.

21. A computer-readable medium programmed to block shared memory by a method comprising:

providing a call to reserve a memory page for a requesting process;

filtering the reserve call according to whether the page can be shared;

providing a call to commit the memory page for the requesting process or for a subsequent requesting process;

filtering the commit call according to whether the page can be shared and whether the process can be secured;

wherein filtering the commit call comprises:

determining, by accessing a shared memory list, if the page is shared by another process;

if the page is shared, determining whether either of the sharing processes are secured by accessing a secured process list; and if either process is secured, disallowing page sharing; or if both processes are not secured, creating a new shared memory record, updating the share count for processes sharing the page and updating the shared memory list with information contained in the new record; or if the page is not shared, completing the commit request.

22. The computer-readable medium of claim 21 wherein filtering the reserve call comprises:

determining whether the page can be shared based on request parameters; and if the page cannot be shared, allowing the request to be completed; or if the page can be shared, tracking the reserve call by creating a record and entering the record into a shared memory list.

23. The computer-readable medium of claim 22 wherein the record includes a process ID, page number and share count.

24. The computer-readable medium of claim 21 wherein the record includes a process ID, page number and share count.

25. The computer-readable medium of claim 21 further comprising:

providing a call to free the memory page of all address spaces;

determining whether the process is secured by checking a secured process list; and if the process is secured, overwriting the page to delete secured data, and deleting all records in the shared memory list with a page number the same as the overwritten page; or if the process is not secured deleting all records from a shared memory list with a page number corresponding to the unsecured process page.

\* \* \* \* \*